Nov. 13, 1951          J. W. COX          2,574,959
APPARATUS FOR HANDLING AND PACKAGING EGGS
Filed Jan. 12, 1946          3 Sheets-Sheet 1
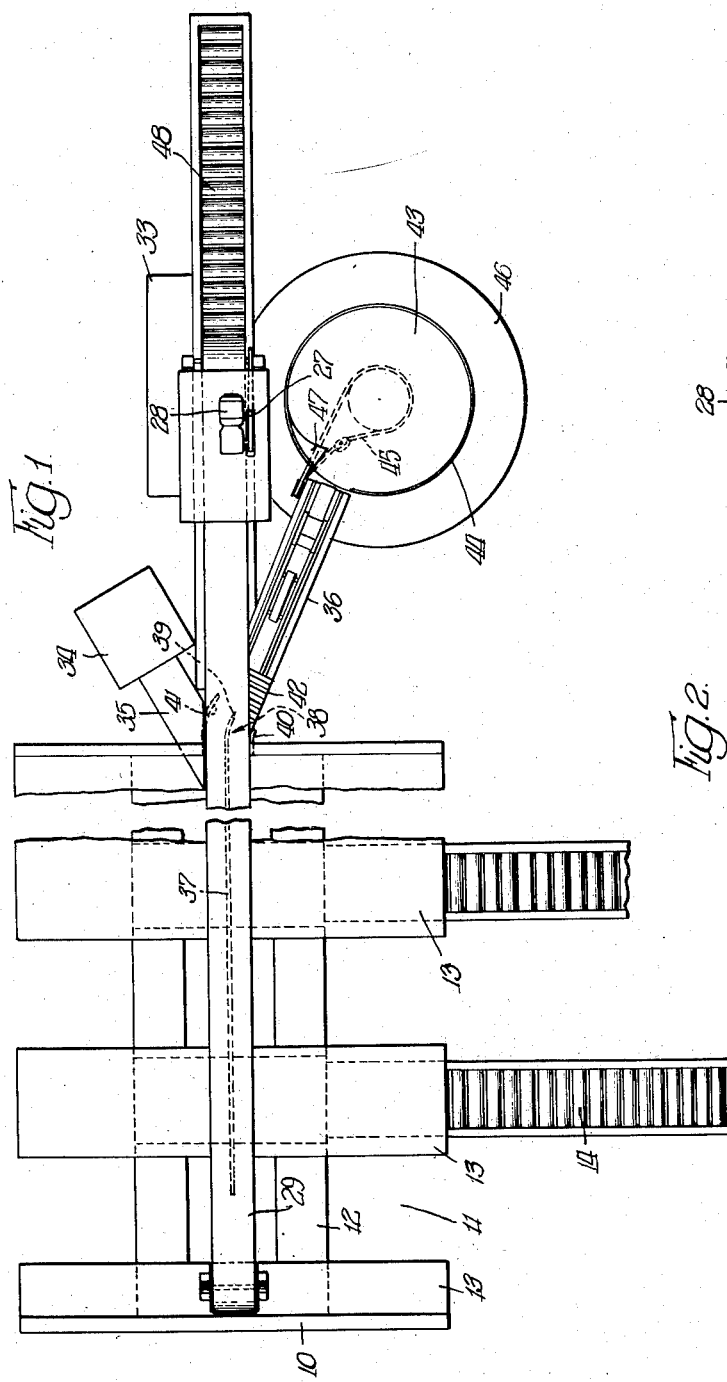
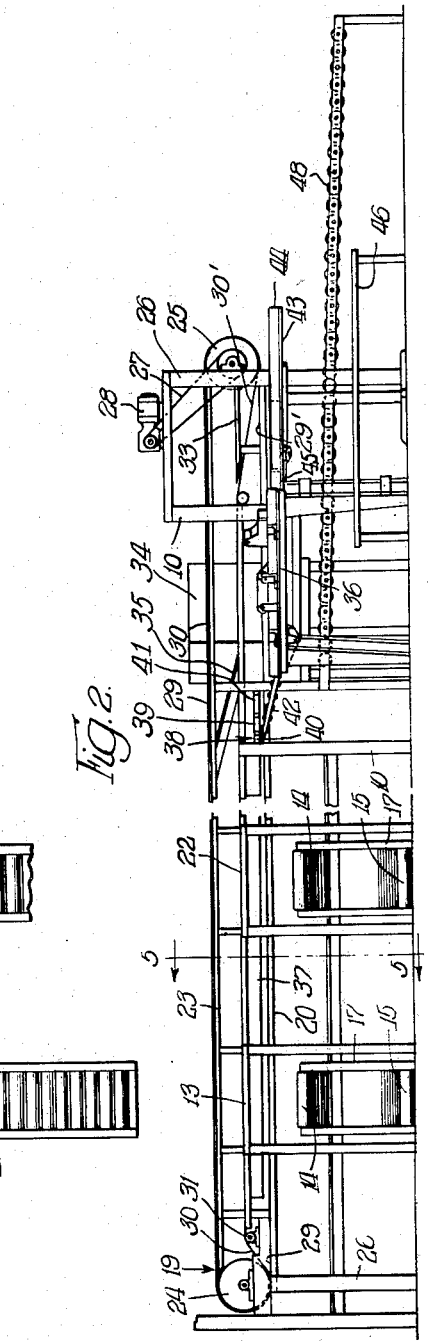
INVENTOR.
John W. Cox
BY
Cromwell, Greist & Warden
ATTORNEYS

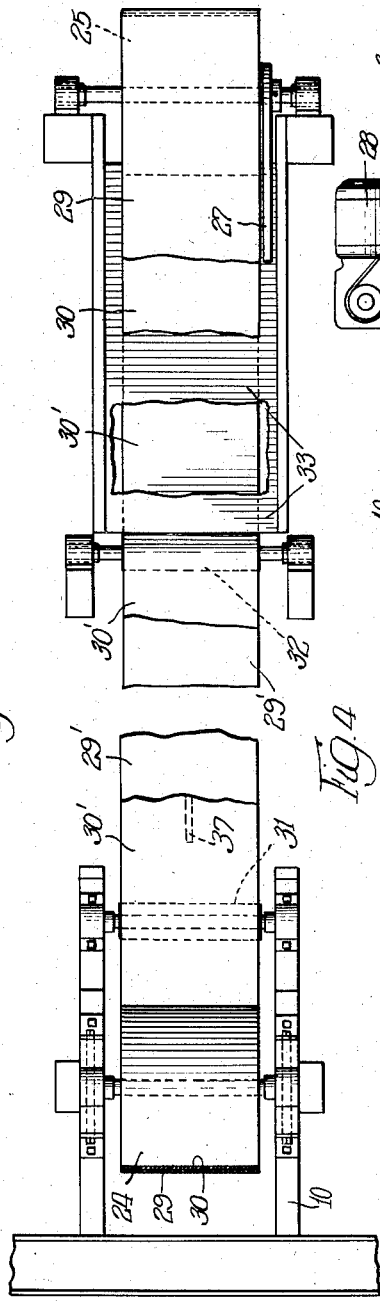
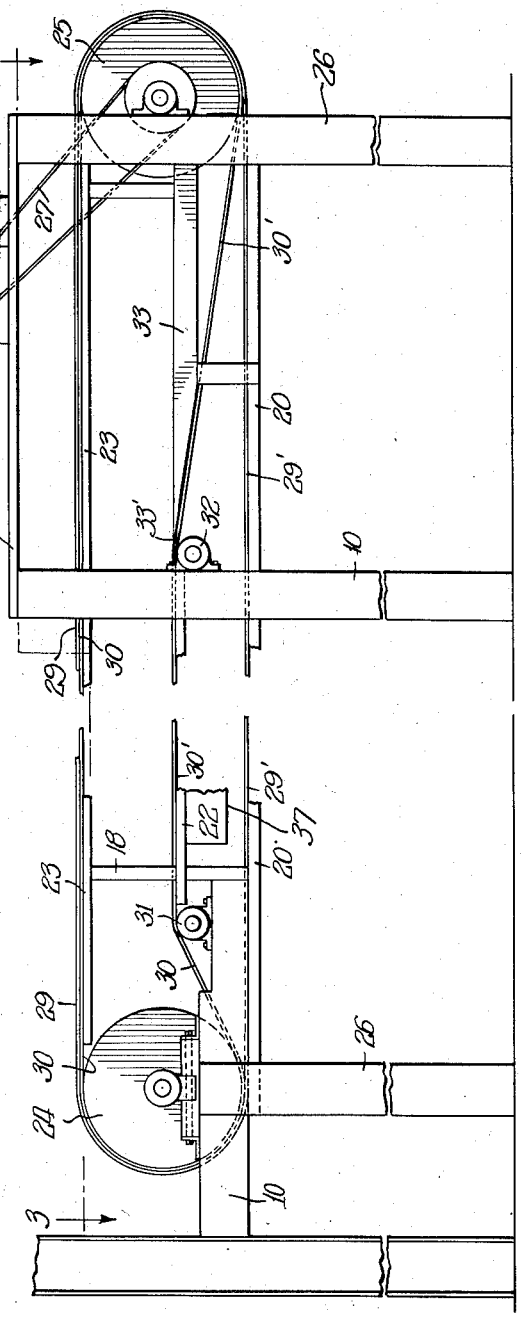

Nov. 13, 1951 J. W. COX 2,574,959
APPARATUS FOR HANDLING AND PACKAGING EGGS
Filed Jan. 12, 1946 3 Sheets-Sheet 3

INVENTOR.
John W. Cox
BY
Cromwell, Greist & Warden
ATTORNEYS

Patented Nov. 13, 1951

2,574,959

UNITED STATES PATENT OFFICE 2,574,959

APPARATUS FOR HANDLING AND PACKAGING EGGS

John W. Cox, Chicago, Ill., assignor, by mesne assignments, to Shellmar Products Corporation, Chicago, Ill., a corporation of Delaware Application January 12, 1946, Serial No. 640,778

10 Claims. (Cl. 93—7)

1

This invention relates to apparatus for the handling, inspection and packaging of eggs in large capacity egg rooms, and more particularly to a belt-type machine whereby empty egg cartons, filler and flat assemblies containing loose eggs, and filled cartons are conveyed in two directions along three parallel paths to and from various operators in such manner as to improve the output and efficiency of these operators.

It is an object of the invention to provide egg room handling and conveying equipment of the above type which is relatively simple and inexpensive in construction, enabling a substantial saving in the cost of a multiple belt conveyor constituting a part thereof, by reason of a novel arrangement of a plurality of belts and common driving means therefor.

A still further object is to provide a conveyor of the type described including dual belts arranged in a novel manner to provide three separate article conveying traveling belt reaches.

Yet another object is to provide a belt conveyor apparatus for egg rooms enabling a single operator to set up empty egg cartons and to remove and dispose of loose eggs returned from the candlers in conventional fillers and flats, thereby relieving the candlers of a time consuming operation which reduces their productive efficiency.

A still further object is to provide an apparatus of the type described in the form of a belt-type conveyor embodying separate, continuous belts having a common drive means and supporting and guiding means arranged whereby three separate belt reaches are available, one reach of which travels in the opposite direction from two other reaches.

More specifically, an object of the invention is to provide apparatus of the type described, comprising dual superposed belt conveyors in concentric association with common pulley or drum driving and guide means, which reduces to a minimum the number of parts required to afford the desired three separate conveyor reaches, and saves much space.

The foregoing statements are indicative in a general way of the nature of the invention, but other and more specific objects will be apparent to those skilled in the art upon a full understanding of the construction and operation of the device.

A single embodiment of the invention is presented herein for the purpose of exemplification, but it will be appreciated that the invention is susceptible of incorporation in other modified forms coming equally within the scope of the appended claims.

In the drawings,

Fig. 1 is a fragmentary plan view, mainly of schematic character, illustrating the apparatus of my invention in its normal association with certain egg room equipment, only the most important structural details being included in this figure;

Fig. 2 is a fragmentary side elevation of the apparatus illustrated in Fig. 1;

Fig. 3 is a fragmentary plan view, further illustrating details of the belt arrangement of the conveyor illustrated in Figs. 1 and 2, portions of the apparatus having been removed for the purpose of clarity, i. e., the structure being viewed on a line generally corresponding to line 3—3 of Fig. 4;

Fig. 4 is a fragmentary view in side elevation, further illustrating details of the apparatus.

Figure 5:
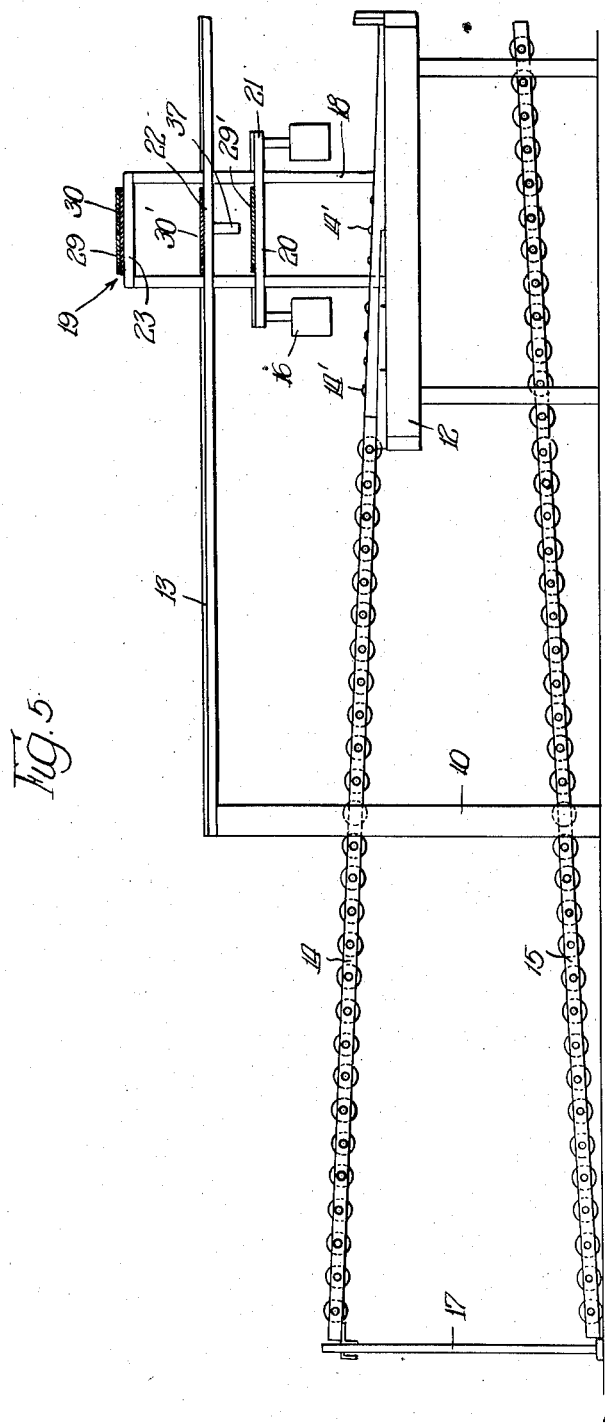
Fig. 5 is an end elevation, viewed from line 5—5 of Fig. 2, further illustrating the apparatus shown in the foregoing figures, particularly in the relation thereto of the belt conveyor components of said apparatus, the crate supply and disposal provisions also being shown.

The present invention affords a novel apparatus for use in commercial egg rooms of large capacity, whereby said capacity is further enhanced. This result is accomplished by a novel arrangement of parts (a) for the feeding of empty, erected egg cartons from a carton set-up station in a linear direction past a plurality of candling stations, on an upper reach of a dual belt assembly; (b) for the return of flats and fillers on another belt reach from the candling station in an opposite though parallel linear direction to a discharge point adjacent the carton set-up station, where they may be removed by the carton set-up attendant; and (c) for the conveying of the cartons filled with candled eggs, on a separate reach paralleling one of the referred to reaches, to a point where said filled cartons are closed, sealed, dated and forwarded to an operator who completes the packing thereof in crates or cases. The apparatus is notable for the simplicity of construction and arrangement of its parts, which is in large measure contributed by the dual conveyor arrangement referred to, eliminating need for the numerous pulleys, fittings and the like which would otherwise be required, were a conventional double belt conveyor employed.

Referring to Figs. 1 and 2, which contain a generalized illustration of the apparatus, the reference numeral 10 in general designates an elongated framework, including uprights, tables, benches and supports, which is ordinarily disposed in an egg room. This framework has disposed therealong a plurality of candling stations 11, of which only two pairs are illustrated in full in Figs. 1 and 2. It will be understood, however, that the equipment normally affords operating stations for a much greater number of candlers. At each station the frame 10 supports a candler's table or bench 12 at approximately waist height and a pair of elevated shelves or platforms 13 at either side of the station 11, it being understood that one-half of each intermediate platform 13 is available to the respective operators on either side thereof. Filled crates of eggs are supplied to the operators along the downwardly and inwardly inclined, laterally extending roller-type conveyors 14, while the emptied crates are disposed of laterally in the opposite direction on the similar downwardly and outwardly inclined roller conveyor 15 located beneath conveyor 14. The crates will be supplied and removed by an attendant operating at the outer extremities of the conveyors 14 and 15, hence out of the way of the candlers. As illustrated in Fig. 5, the conveyor 14 may be provided with ball caster anti-friction members 14' in its overhang of table 12, in substitution for rollers. Suitable candling lights 16 are disposed over the benches 12 in the manner also illustrated in Fig. 5.

The conveyors 14, 15 are appropriately supported on the framewok 10 and table 12, as well as by suitable uprights 17 at their lateral extremities, and table 12 also serves as a support for an elongated central superstructure 18 (see Fig. 5), whereon the three separate reaches of the dual belt conveyor, generally designated 19, are supported in their travel. To this end, the superstructure 18 has a lower longitudinally extending belt guiding and supporting surface 20, this being carried laterally outwardly of the superstructure 18 to afford a shelf-like support 21 for the candler's light 16 and for other purposes of convenience. An intermediate longitudinal guiding and supporting surface 22 and a similar upper surface 23 are carried by frame 10 in vertically spaced relation above table 12 and lower surface 20. These three surfaces are in vertical alignment and are substantially coextensive lengthwise, as clearly illustrated in Figs. 2 and 4, though the intermediate surface is modified in effect in a manner to be described.

The dual conveyor 19 comprises a spaced pair of large drum-like end pulleys 24, 25 journaled respectively over suitable upright supports 26 of frame 10, adjacent opposite ends thereof, the pulley 25 being driven by a belt or chain 27 from a motor 28 which is supported at an elevated upper point on the frame. The reference numerals 29, 30 designate respectively outer and inner endless conveyor belts of any suitable wear resistant material such as a fabric composition, canvas, leather, or the like, which belts are trained around the pulleys 24, 25. As illustrated, the belts 29, 30 are vertically aligned and the outer is superposed directly on the inner for about 180° of concentric arcuate travel around the respective pulleys 24, 25. The top reaches of the conveyors 29, 30 travel in contact with one another over the upper supporting surface 23 on the superstructure 18, being slidably sustained vertically by that surface, while the lower reach 29' of outer belt 29 slides on and is vertically sustained by the lowermost guide surface 20 of the superstructure. However, the lower reach 30' of the inner conveyor belt 30 is vertically separated from said reach 29' immediately as it leaves pulley 24 (the direction of rotation of said pulley being counterclockwise, as viewed in Figs. 2 and 4), and is trained upwardly over an idling guide roller 31 located immediately adjacent the left-hand end of the intermediate surface 22, as viewed in Fig. 4. Thereafter the aforesaid lower reach 30' of belt 30 slides over surface 22 and is guidingly sustained thereby in spaced relation to the lower reach 29' of the outer conveyor 29. This affords two parallel, vertically separated belt conveyor reaches which travel in the same (or return) direction at approximately the same speed, and oppositely of the third (or outgoing) conveyor reach. Reaches 29', 30' are available to the candlers at stations 11 for the reception respectively of filled egg cartons and excess flat and filler assemblies having uncartoned eggs therein, the articles in both instances being carried in a return direction, or to the right as viewed in Fig. 4, for ultimate disposal by another operator.

Intermediate belt reach 30' travels to a point spaced substantially to the left of pulley 25, where it passes downwardly over an idler guide roller 32 to gradually merge with the lower reach 29' of the outer conveyor and pass concentrically around said pulley 25; however, an auxiliary discharge table or station 33 on the frame substantially bridges the space between surface 22 and that pulley, being in effect a vertically exposed extension or continuation of surface 22. Table 33 has a knife-edge margin 33' extending closely adjacent roller 32, under which the reach 30' passes, as illustrated in Fig. 4; hence, flat end filler assemblies or like articles traveling on said conveyor reach are shifted off said reach onto the auxiliary table or station 33 as the reach passes beneath the table. This greatly facilitates the handling of the said assemblies and removal thereof from the apparatus. As illustrated in Fig. 1, table 33 projects laterally to one side of the frame for the convenience of the operator in removing articles therefrom.

From the foregoing, it will be appreciated that empty set-up egg cartons will be disposed on the parallel, contacting outgoing upper reaches of conveyors 29, 30, to be carried thereby to the candlers at the various stations 11, while filled but unclosed cartons will be conveyed in return direction on the lowermost reach 29' to be closed, sealed, dated and then disposed of in a manner to be described. Uncartoned eggs in filler and flat assemblies are placed by the candlers on the intermediate reach 30' for conveyance to table 33 and another removal point, thereby relieving the candlers of the function of handling and disposing of such articles.

A carton set-up station, at which collapsed paper board egg cartons are initially erected, is illustrated in Fig. 1 and designated by the reference numeral 34, but, since this instrumentality per se constitutes no part of the invention, other than units positional relationship to other components of the apparatus, it has been illustrated only diagrammatically. It may take the form of an automatic carton set-up machine of well known type, or one or more manually set-up machines may be employed. However, it should be noted that the set-up station is located immediately adjacent the side of the table 33 described above. The carton set-up operator is therefore enabled to take over the disposal of articles delivered to table 33 by belt reach 30', rather than the candlers, as was previously the case. Cartons set up by device 34 are automatically urged upwardly along an inclined way 35 onto the upper conveyor reach, to be transported thereby in the manner referred to above.

The filled cartons which return to the right on the lower reach 29' of outer belt 29 are diverted at a point substantially spaced from pulley 25 from their longitudinal path onto a double closing and sealing mechanism 36 (see Fig. 1) by which the covers of the carton are automatically closed, a seal is applied, and, if desired, a date printed on the cartons. It will be understood that candlers on opposite sides of the belt conveyor place their output on the lower reach 29' of belt 29; a depending, medial dividing panel 37 carried by intermediate support 22 serves to separate cartons filled on said opposite sides and so deposited on the belt. This panel extends longitudinally of the apparatus, projecting downwardly to a point spaced above belt reach 29', at the transverse midpoint thereof. In operation, the candlers deposit two parallel lines of filled cartons on reach 30' with the carton rear walls and open, vertically extending covers adjacent or against panel 37, to be transported to the device 36 at one side of the conveyor.

Diversion of the still open cartons from the conveyor reach 29' is accomplished by means of a diverter 38 of the general type shown and described in the application of Edward W. Fahey, Serial No. 611,589, filed August 20, 1945. As here illustrated conventionally, it consists of a curved finger-like sweep 39 projecting from the end of longitudinal dividing wall panel 37, plus a pair of similar sweeps 40, 41 paralleling member 39 but attached to opposite sides of the lower support 20. Provisions are made to insure a smooth entry of the cartons into the parallel ways between the respective pairs of sweeps 39, 40 and 39, 41. Hence, the lines of cartons are diverted from the belt to device 36 while still maintained in the proper parallel back-to-back relation on which the operation of the cover closer depends. A suitable auxiliary conveyor, belt or the like 42 is preferably provided to transport the cartons over a downward inclination to the closer 36.

The closing and sealing device 36 discharges onto a rotary receiving table 43 surrounded throughout a major part of its circumference by an annular fence 44. This table is rotated in any appropriate fashion as by a belt drive connection 45 to the mechanism 36 and transports the closed cartons in a circular path past a number of packing operators disposed at points peripherally of the table. A stationary circular bench 46 surrounds the table, on which the packers rest crates or cases while filling the latter with the cartons delivered to the rotary table. A curved diverting arm 47 is disposed adjacent the discharge of the closing mechanism. This serves to divert filled cartons which have not been removed from the rotary table radially inwardly thereof, so as not to interfere with the discharge of cartons from said closing and sealing mechanism.

The reference numeral 48 designates a downwardly inclined roller conveyor disposed beneath and parallel to the belt conveyors, on which loose eggs in filler and flat assemblies (from table 33) and those packed in cases (from table 43) may be disposed for transport to a shipping or other station.

From the above, it is clear that the conveyor illustrated and described effects a considerable economy of parts while affording the desired three vertically spaced traveling conveyor reaches. As compared to a superposed pair of parallel belts having individual pulleys, the concentric disposition of the belt conveyors 29, 30 on common pulleys 24, 25 eliminates the need for two additional pulleys, along with separate driving provisions therefor and the numerous other fittings occasioned thereby. It at the same time effects a great economy in space. The various reaches are disposed at heights for convenient access by the operators or candlers, which is impossible in the case of a vertically cascaded arrangement of belts, pulleys, etc. In the present construction, the necessary three-belt reaches have been incorporated in the vertical space normally occupied by a single belt and its pulleys.

A single operator, disposed adjacent table 33, is within convenient reach of the belts for the removal and disposal of flat and filler assemblies from the belt conveyor and is in close proximity to the discharge roller conveyor 48. The same operator is also very conveniently located for the supervision of the carton set-up machine.

Fatigue of the candlers is minimized in that their work is removed at convenient levels and they receive empty cartons at a relatively low height. Moreover, they are not interrupted by the need to dispose of accumulated filler and flat assemblies.

I claim:

1. In apparatus for handling articles, a conveyor comprising a pair of end guide pulleys, a plurality of endless belts trained around said pulleys in vertically superposed concentric relation to said pulleys, a pair of longitudinally spaced rollers disposed intermediate said pulleys, and between the upper and lower reaches of the outermost of said belts, to divert a reach of an inner belt to an intermediate, vertically spaced and parallel relation to the outer belt for a substantial lengthwise travel, said outer and intermediate belt reaches providing article conveying surfaces, and means positioned between said longitudinally spaced rollers to sustain said diverted reach.

2. In apparatus for handling articles, a conveyor comprising a pair of end guide pulleys, a plurality of endless belts trained around said pulleys in concentric, vertically superposed relation to said pulleys, longitudinally spaced means to divert a reach of one of said belts in vertically spaced and parallel relation to the corresponding reach of another belt for a substantial lengthwise travel, and means for individually sustaining said reaches during said lengthwise travel to provide article conveying surfaces, including a support disposed between said longitudinally spaced diverting means to sustain the diverted portion of said first named belt reach.

3. In apparatus for handling eggs, a conveyor comprising a pair of end guide pulleys, a pair of vertically superposed, endless conveyor belts trained around said pulleys in concentric relation to both of said pulleys, means disposed between the upper and lower reaches of the outer belt to direct and maintain a reach of the inner belt in vertically spaced parallel relation to the outer belt reaches throughout a substantial portion of the length thereof, said three reaches serving as article conveying members of which one travels reversely to the other two, and individual elongated supporting surfaces sustaining said three reaches during the lengthwise parallel travel thereof.

4. In apparatus for handling eggs, a conveyor comprising a pair of end guide pulleys, a pair of vertically superposed, endless conveyor belts trained around said pulleys in concentric relation to both of said pulleys, means disposed between the upper and lower reaches of the outer belt to direct and maintain a reach of the inner belt in vertically spaced, parallel relation to the outer belt reaches throughout a substantial portion of the length thereof, said three reaches serving as article conveying members of which one travels reversely to the other two, individual elongated supporting surfaces sustaining said reaches during the lengthwise parallel travel thereof, and an extension surface aligned longitudinally and vertically with the intermediate surface at a longitudinal extremity thereof, the intermediate reach being trained by said first named means beneath said extension surface whereby to deposit thereon articles conveyed by the last named reach.

5. Apparatus for handling articles, comprising three vertically spaced, elongated supporting surfaces, a pair of pulleys journaled at opposite ends of said surfaces, a pair of vertically aligned belts each concentrically trained around said pulleys, the top reaches of said belts being in supported relation to and sustained in an outward direction of travel thereof by the uppermost surface and the bottom reach of the outermost belt being in supported relation to and sustained in a reverse return direction of travel by the lowermost surface, and means to divert the bottom reach of the innermost belt vertically to the intermediate supporting surface, the last named surface having supporting contact with and sustaining said reach for travel in guided relation to the others.

6. A conveyor mechanism comprising a plurality of belts, a pair of spaced-apart pulleys defining the overall conveyor length, said pulleys being common to all said belts and carrying the same in vertically superposed relation, means for diverting at least one reach of one of said belts out of its normal path of travel in side-by-side relation to the corresponding reach of another belt, to thereby define a plurality of vertically spaced article conveying surfaces at least two of which travel in a common direction when the pulleys are rotated, and means in supporting relation to said respective reaches substantially throughout the length of their respective article conveying surfaces.

7. In egg room apparatus for handling eggs, an endless belt conveyor comprising a pair of horizontal belts, pulleys about which the belts are trained in longitudinal and vertical alignment with one another, and vertically spaced means coacting with said pulleys in supporting and affording three article conveying belt reaches disposed at different vertical levels, means defining a carton set-up station feeding to said conveyor at the level of and onto one of the outer reaches, means defining a fixed discharge station between said pulleys substantially at the level of and in longitudinal alignment with the intermediate reach of the conveyor for the reception of articles transported thereon, a carton closing mechanism associated with said conveyor and provided with a receiving portion in generally coplanar, laterally adjacent receiving relation to the other outer reach and between said pulleys, and means for diverting filled cartons from said last named reach onto said receiving portion for travel through said closing mechanism.

8. In egg room apparatus for handling eggs, an endless conveyor comprising plural belts in longitudinal and vertical alignment with one another, pulleys supporting the opposite ends thereof, and means coacting with said pulleys in supporting said belts to provide a plurality of belt reaches disposed at different vertical levels, means defining a fixed discharge station disposed between said pulleys substantially at the level of and in longitudinal alignment with one of said reaches for the reception of articles transported thereon, a carton closing mechanism associated with said conveyor and provided with a receiving portion in angular relation thereto adjacent and approximately at the level of another of said reaches, and means for diverting filled cartons from said other conveyor reach onto said receiving portion for travel through said closing mechanism.

9. In egg room apparatus for handling eggs, an endless conveyor comprising pulley and belt means providing plural vertically spaced, horizontal belt reaches trained in longitudinal and vertical alignment with one another around pulleys at the opposite ends thereof, means defining a fixed discharge station disposed between said pulleys substantially at the level of and in longitudinal alignment with one of the reaches of the conveyor for the reception of articles transported thereon, a carton closing mechanism associated with one side of said conveyor said mechanism having a receiving portion disposed in angular relation to and approximately at the level of another of said reaches, means for diverting filled cartons laterally from said last named reach onto said receiving portion for travel through said closing mechanism, and a carton set-up device located between said pulleys on the opposite side of said conveyor from said closing mechanism, said set-up device discharging to said conveyor at the level of still another of said reaches.

10. In egg room apparatus for handling eggs and the like, an endless conveyor comprising a pair of end pulleys and a pair of endless, horizontally extending, longitudinally and vertically aligned belts trained around said pulleys in concentric relation to one another at the pulleys, means for spacing a reach of one of said belts vertically intermediate the other reaches, means defining an article discharge station positioned between said pulleys in longitudinal aligned, coplanar, receiving relation to said spaced reach, a carton set-up device located between said pulleys and having means discharging to one of said other reaches, a carton closing mechanism provided with intake means disposed in generally coplanar receiving relation to another of said other reaches and extending angularly from the conveyor, and means to divert filled cartons from said last named reach onto said intake means for travel through said closing mechanism.

JOHN W. COX.

REFERENCES CITED

The following references are of record in the file of this patent:

UNITED STATES PATENTS

| Number | Name | Date |
|---|---|---|
| 890,292 | Monette | June 9, 1908 |
| 920,079 | Nuttall et al. | Apr. 27, 1909 |
| 1,306,477 | Frey | June 10, 1919 |
| 1,822,111 | Richardson et al. | Sept. 8, 1931 |
| 2,254,116 | Cooper et al. | Aug. 26, 1941 |
| 2,264,461 | Steves | Dec. 2, 1941 |
| 2,359,464 | Carothers et al. | Oct. 3, 1944 |

FOREIGN PATENTS

| Number | Country | Date |
|---|---|---|
| 399,204 | Great Britain | Oct. 2, 1938 |